US012245989B2

(12) United States Patent
D'Angelo et al.

(10) Patent No.: US 12,245,989 B2
(45) Date of Patent: Mar. 11, 2025

(54) PLUNGER FOR A SYRINGE-TYPE PUMP FOR A MACHINE FOR ENCAPSULATION OF SOFT CAPSULES, AND SYRINGE-TYPE PUMP COMPRISING ONE OR MORE OF SAID PLUNGERS

(71) Applicant: Altergon SA, Lugano (CH)

(72) Inventors: Giovanni D'Angelo, Lugano (CH); Marco Pontiggia, Lugano (CH); Simone Carucci, Lugano (CH); Paolo Russo, Lugano (CH)

(73) Assignee: Altergon SA, Lugano (CH)

( * ) Notice: Subject to any disclaimer, the term of this patent is extended or adjusted under 35 U.S.C. 154(b) by 609 days.

(21) Appl. No.: 17/641,093

(22) PCT Filed: Sep. 22, 2020

(86) PCT No.: PCT/IB2020/058816
§ 371 (c)(1),
(2) Date: Mar. 8, 2022

(87) PCT Pub. No.: WO2021/059117
PCT Pub. Date: Apr. 1, 2021

(65) Prior Publication Data
US 2022/0354749 A1 Nov. 10, 2022

(30) Foreign Application Priority Data
Sep. 23, 2019 (IT) ........................ 102019000016925

(51) Int. Cl.
*A61J 3/07* (2006.01)

(52) U.S. Cl.
CPC ..................................... *A61J 3/074* (2013.01)

(58) Field of Classification Search
None
See application file for complete search history.

(56) References Cited

U.S. PATENT DOCUMENTS

| | | | |
|---|---|---|---|
| 3,738,493 A | 6/1973 | Cummins et al. |
| 4,141,833 A | 2/1979 | Cummins |
| 2004/0248425 A1 | 12/2004 | Bem et al. |

FOREIGN PATENT DOCUMENTS

| | | |
|---|---|---|
| CA | 453243 | 12/1948 |
| CA | 453243 A * | 12/1948 |

(Continued)

OTHER PUBLICATIONS

International Search Report and the Written Opinion Dated Dec. 15, 2020 From the International Searching Authority Re. Application No. PCT/IB2020/058816. (11 Pages).

(Continued)

*Primary Examiner* — Dominic Lazaro

(57) ABSTRACT

A plunger is described, which is configured for application in a syringe-type pump for a machine for encapsulation of soft capsules, for adjusting the quantity of filler to be injected into said soft capsules, said plunger having an axially developing structure and comprising:

- a tip (31) and a sealing body (32) connected to the tip, adapted to penetrate into said syringe-type pump (P),
- a first mechanical abutment ring (33), fixedly positioned, connected to said sealing body,
- a plunger stopper housing (34), connected to said fixedly positioned mechanical abutment ring,
- a second mechanical abutment ring (35), axially adjustable,
- a mechanical dowel (37) protruding from said stopper housing,
- an adjuster nut (36) adapted to be screwed on said mechanical dowel (37) for adjusting the axial position of the second ring (35) relative to the first ring, so as to adjust the axial position of the plunger in said syringe-type pump (P).

8 Claims, 7 Drawing Sheets

(56) References Cited

FOREIGN PATENT DOCUMENTS

| | | |
|---|---|---|
| CN | 108697583 | 10/2018 |
| EP | 0443227 | 8/1991 |
| GB | 969781 | 9/1964 |
| GB | 1149041 | 4/1969 |
| WO | WO 2004/075264 | 9/2004 |
| WO | WO 2006/066363 | 6/2006 |

OTHER PUBLICATIONS

Notification of Office Action and Search Report Dated Oct. 12, 2024 From The State Intellectual Property Office of the People's Republic of China Re. Application No. 202080063408.7 and Its Summary in English. (9 Pages).

* cited by examiner

PLUNGER FOR A SYRINGE-TYPE PUMP FOR A MACHINE FOR ENCAPSULATION OF SOFT CAPSULES, AND SYRINGE-TYPE PUMP COMPRISING ONE OR MORE OF SAID PLUNGERS

RELATED APPLICATIONS

This application is a National Phase of PCT Patent Application No. PCT/IB2020/058816 having International filing date of Sep. 22, 2020, which claims the benefit of priority of Italian Patent Application No. 102019000016925 filed on Sep. 23, 2019. The contents of the above applications are all incorporated by reference as if fully set forth herein in their entirety.

FIELD AND BACKGROUND OF THE INVENTON

The present invention relates to a plunger for a syringe-type pump for a machine for encapsulation of soft capsules, and to a syringe-type pump comprising one or more of said plungers.

Soft capsules are a pharmaceutical form in which a material, called filler, is incorporated into a capsule of soft gelatin.

One example of a long-known preferred method is the so-called "rotary-die process", developed as early as 1932 by P. Scherer, e.g. as described in CA333007A, CA416849A, CA416850A, CA422183A, CA453243A. With this method it is possible to form, fill and seal soft capsules in a single operation. In this process, two bands obtained from a melted mass of gelatin (or another suitable gelling compound) are fed to two half-dies having the desired shape, formed in the surfaces of two rotary continuous rollers. As the die closes through the effect of the rotation, the content, called filler, is injected by a syringe-type metering pump into the capsule thus formed, which capsule is then released when the die opens again.

Encapsulation machines and methods of using such machines have been known for a long time, e.g. as described in US2002026772A1, or in the article by R. P. Gullapalli entitled "Soft Gelatin Capsules (Softgels)" JOURNAL OF PHARMACEUTICAL SCIENCES, VOL 99, NO. 10, October 2010.

The known metering system of an encapsulation machine for production of soft capsules consists of a syringe-type metering pump comprising two sets of plungers.

In the metering system known in the art, the stroke of the plungers of the syringe-type pump is adjusted by means of a micrometric knob provided on one side of the machine.

All such plungers move in the same manner, in accordance with a fine adjustment referred to as pump stroke.

By changing the stroke of these plungers, it is possible to change the quantity of filler injected into the soft capsule, and hence the metered amount of active principle.

Many small variables may affect the quantity of filler injected by each plunger, such variables leading to what is commonly referred to as physiological system variability.

For very big capsules, with a considerable amount of injected filler, this variability has virtually no impact on the quality of the finished product. In the case of micro-injected special fillers, on the contrary, such small variations may considerably affect the quality of the finished product.

Such variables are many and may be of mechanical nature, e.g. micrometric differences between the various plungers and the pump body, or small dimensional differences among the gaskets and the mechanical strength thereof, etc. Such variables may be related to pump assembly precision or to the physical characteristics of the filler.

SUMMARY OF THE INVENTION

It is therefore the object of the present invention to propose a plunger for a syringe-type pump for a machine for encapsulation of soft capsules, and a syringe-type pump comprising one or more of said plungers, which can overcome the above-mentioned problems.

During the development of the soft-capsule formulation of some products, the inventors have come to face the need for adjusting, in addition to the chemical-physical characteristics of the filler, also the mechanical characteristics of the injection system in order to reduce the variability in the weight of the single capsules.

According to the standard system, the stroke of the pump is adjusted by means of a micrometric knob provided on one side of the machine. This adjustment changes the stroke of all plungers at the same time, and does not allow changing the quantity of filler injected by each individual plunger.

While operating extremely well for many types of fillers and capsules, for some particular formulations this system cannot ensure good weight uniformity, and hence a titre very close to 100% with a very narrow cv (coefficient of variation).

In order to process some special fillers, it was necessary to change the gaskets in order to improve the performance of the system over time. Nonetheless, the introduction of special gaskets still did not permit a fine adjustment of the weight of the capsules.

As a consequence, the inventors were compelled to modify and improve the metering system.

The inventors surprisingly found that, by appropriately modifying the plungers of the metering pump, one could obtain soft capsules with low variability of the weight of the filler inside the soft capsule.

This modification makes it possible to adjust the stroke of each individual plunger, thus compensating for the adverse effects of the above-listed variables.

The present invention concerns a plunger configured for application in a syringe-type pump for a machine for encapsulation of soft capsules, for adjusting the quantity of filler to be injected into said soft capsules, said plunger having an axially developing structure and comprising:

- a tip and a sealing body connected to the tip, adapted to penetrate into said syringe-type pump,
- a first mechanical abutment ring, fixedly positioned, connected to said sealing body,
- a plunger stopper housing, connected to said fixedly positioned mechanical abutment ring,
- a second mechanical abutment ring, axially adjustable,
- a mechanical dowel protruding from said stopper housing,
- an adjuster nut adapted to be screwed on said mechanical dowel for adjusting the axial position of the second ring relative to the first ring, so as to adjust the axial position of the plunger in said syringe-type pump.

The present invention also concerns a retaining device for one or more of said plungers in said syringe-type pump.

The present invention further concerns a syringe-type pump for a machine for encapsulation of soft capsules, comprising one or more of said plungers and one or more of said retaining devices.

It is a particular object of the present invention to provide a plunger for a syringe-type pump for a machine for encapsulation of soft capsules, and a syringe-type pump comprising one or more of said plungers, as set out in the claims, which are an integral part of the present description.

BRIEF DESCRIPTION OF THE SEVERAL VIEWS OF THE DRAWINGS

Further objects and advantages of the present invention will become apparent from the following detailed description of a preferred embodiment (and variants) thereof and from the annexed drawings, which are supplied merely by way of non-limiting example, wherein.

In the drawings, the same reference numerals and letters identify the same items or components.

DESCRIPTION OF SPECIFIC EMBODIMENTS OF THE INVENTION

Figure 1:
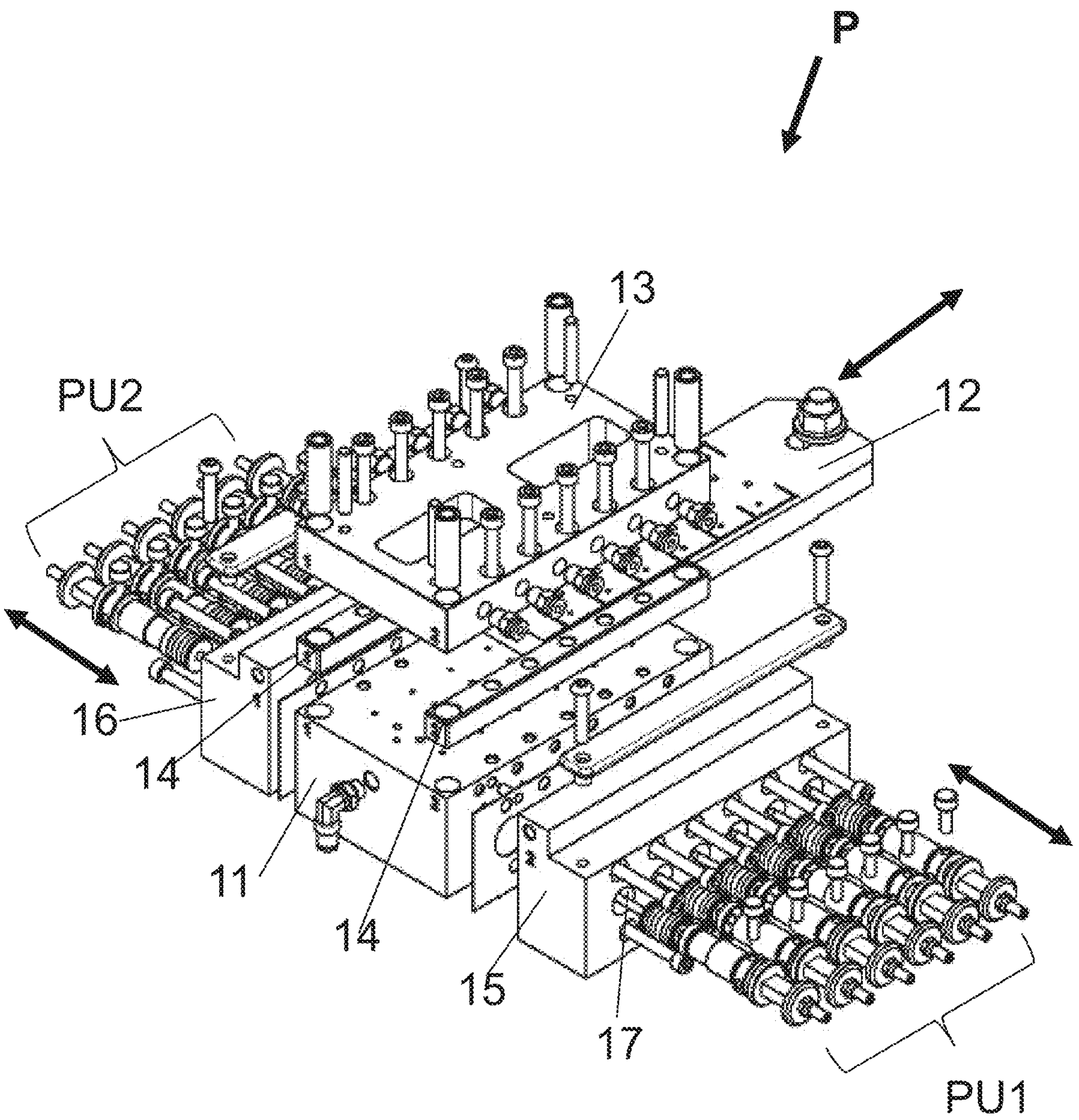
FIG. 1 shows an exploded perspective view of an example of configuration of a syringe-type pump for a machine for encapsulation of soft capsules.

FIG. 1 shows an exploded perspective view of an example of configuration of a syringe-type pump for a machine for encapsulation of soft capsules.

The structure of the pump is known. It will only be briefly described herein, since the person skilled in the art certainly knows its configuration, e.g. as described in the above-mentioned prior-art references.

The pump P has a central body 11 surmounted by a slide 12 adapted to take two positions while sliding across the central body (see arrow). The slide can slide relative to support members 13, 14 adapted to hold it in the proper positions.

At the sides of the central body there are two lateral supports 15, 16 fixed to the central body and performing the function of housing respective sets of plungers PU1, PU2.

The sets of plungers PU1, PU2 can slide within suitable holes 17 formed in both lateral supports 15, 16, moving in the longitudinal direction through the central body 11 (see arrows), perpendicularly to the sliding direction of the slide 12.

There may be gaskets, ring nuts and fastening screws for holding the plungers PU1, PU2 in the correct positions within their housings in the lateral supports. The movements of the plungers are controlled in a per se known manner.

Figure 2:
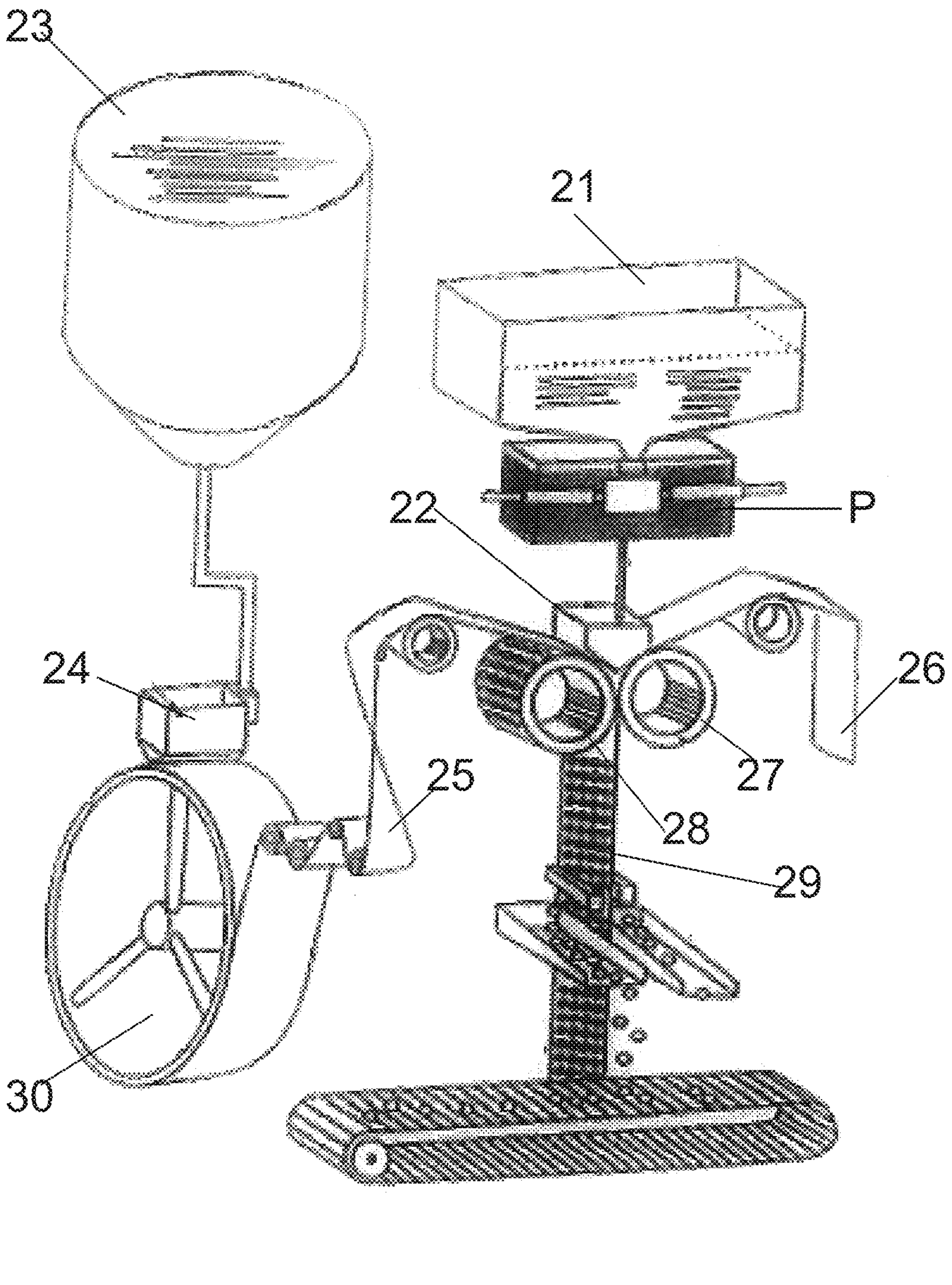
FIG. 2 shows an example of configuration of a machine for encapsulation of soft capsules comprising the syringe-type pump.

FIG. 2 shows an example of configuration of a machine for encapsulation of soft capsules comprising the syringe-type pump P.

The structure of the encapsulation machine is also known. It will only be briefly described herein, since the person skilled in the art certainly knows its configuration, e.g. as described in the above-mentioned prior-art references.

The machine includes, above the pump P, a container 21 containing filler that the pump will have to inject into the soft capsules. Underneath the pump there is an injection system 22 adapted to inject the filler coming from the container 21 into the soft capsules being formed. Formation of the soft capsules occurs by means of two identical systems, only one of which is highlighted in FIG. 2, arranged at the sides of the pump in symmetrical positions, which are adapted to form the two concave surfaces constituting the soft capsules. From a gelatin container 23 containing a gelatinous substance, the latter is spread by a spreading device 24, 30, thus forming the band 25. The band 25 is made of a material suitable for forming one of the two surfaces making up the lateral surfaces of the capsules. The two bands 25, 26 (the other band 26 is formed by a system identical to the one just described, positioned on the opposite side) pass through two mutually facing roller systems 27, 28, which form the two concave surfaces of the soft capsules. During the sliding action, the injection system 22 injects filler into the cavity of the capsules being formed, the two parts of which are then joined, thereby creating capsules internally filled with filler. The injection system 22 uses a set of parallel injectors, one per capsule being formed.

The two sets of plungers PU1, PU2 of the syringe-type pump are in a number equal to the injectors, and are made to reciprocate synchronously with the slide 12, so that their tips, which will be described below, will move back and forth within the pump, with alternate series of thrust and intake phases, thereby adjusting the quantity of liquid to be injected by the injectors into the cavities of the soft capsules being formed. While one set of plungers in the thrust phase determines the filling quantity for the cavities of the capsules, the other set, which is in the intake phase, determines the filling quantity for respective internal cavities in the central body of the pump, thus executing a two-stroke continuous process.

Figure 3A:
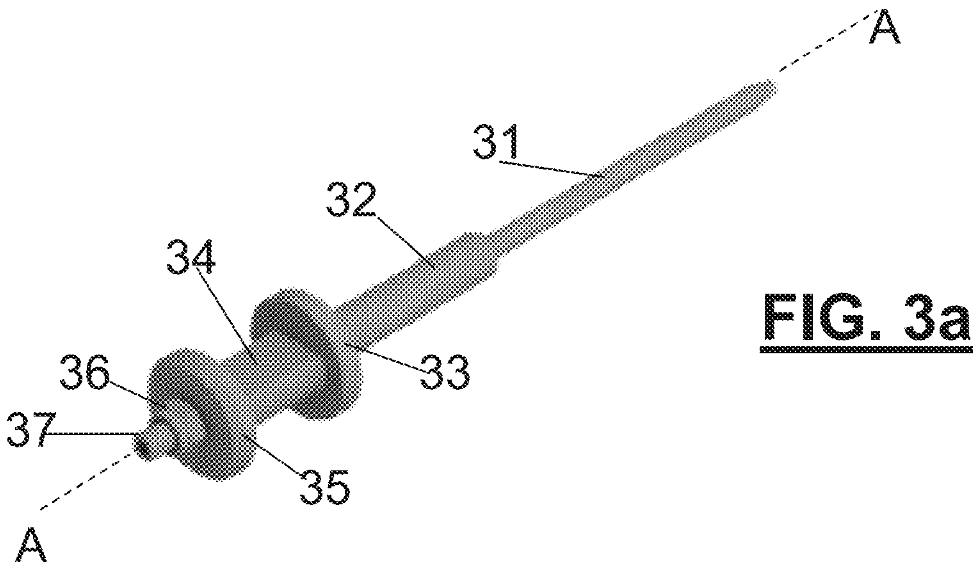
FIGS. 3*a*, 3*b*, 3*c* show, respectively, a perspective view, a whole side view and a sectional side view along line B-B, and a whole side view and a sectional side view along line C-C of an exemplary plunger according to the invention.
Figure 3B:
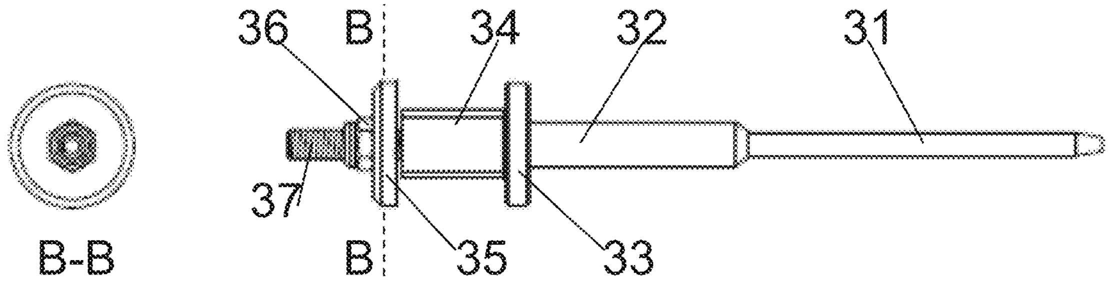

FIGS. 3*a* and 3*b* show, respectively, a perspective view and a whole side view and a sectional side view along line B-B of an exemplary axially developing plunger according to the invention.

The structure of the plunger has an essentially elongate axial development along an axis A-A.

Numeral 31 designates the tip part, numeral 32 designates the sealing body part, numeral 33 designates a mechanical abutment ring in a fixed position on the tip, numeral 34 designates a plunge stopper housing, numeral 35 designates an axially adjustable mechanical abutment ring, numeral 36 designates a nut for adjusting the axial position of the ring 35, and numeral 37 designates a mechanical dowel protruding from the stopper housing. The nut 36 is screwed on the mechanical dowel, so that the nut can take a variable position along the mechanical dowel.

Figure 3C:
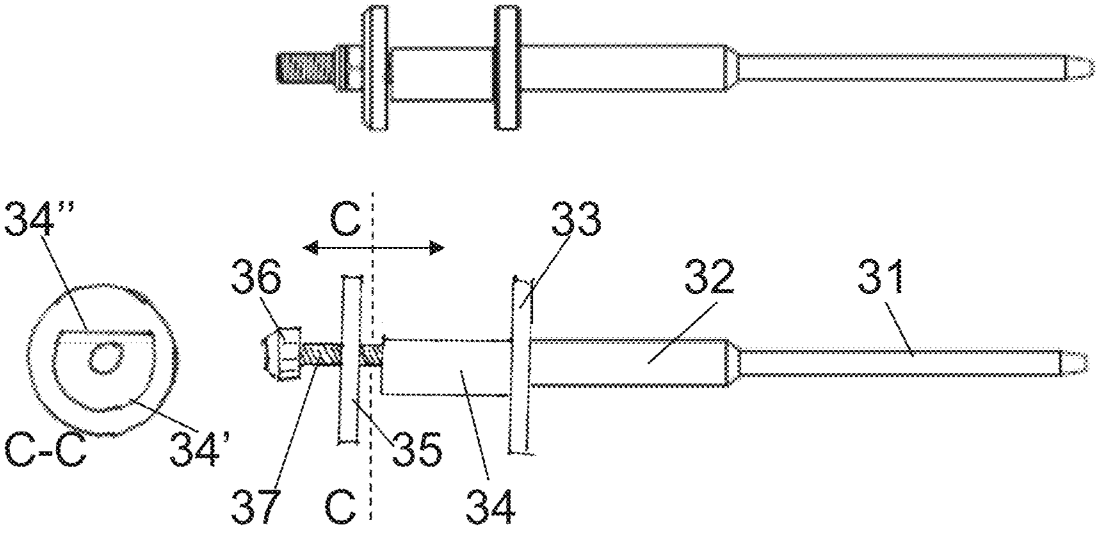

As can be seen in FIG. 3*c*, by acting upon the nut 36 it is de facto possible to space out the nut 35, which is movable, from the ring 33, which is fixed, so as to change the stroke of each individual plunger in comparison with that of the other ones, in accordance with the invention. The terminal of the tip 31 penetrates in a known manner into a suitable cavity internal to the central body 11 of the pump, thereby adjusting the quantity of filler that will fill the associated capsule. According to the invention, by changing the stroke of the plunger it is possible to individually adjust the quantity of filler to be injected into each individual capsule.

FIG. 3*c* also shows a sectional view along line C-C of the plunger, in which it is possible to see that, in the example described herein, the cross-section of the stopper housing 34 essentially has a truncated cylindrical shape, since it has a part 34' with a curved surface and a part 34" with a flat surface. Its function will be described hereinafter.

Figure 4:
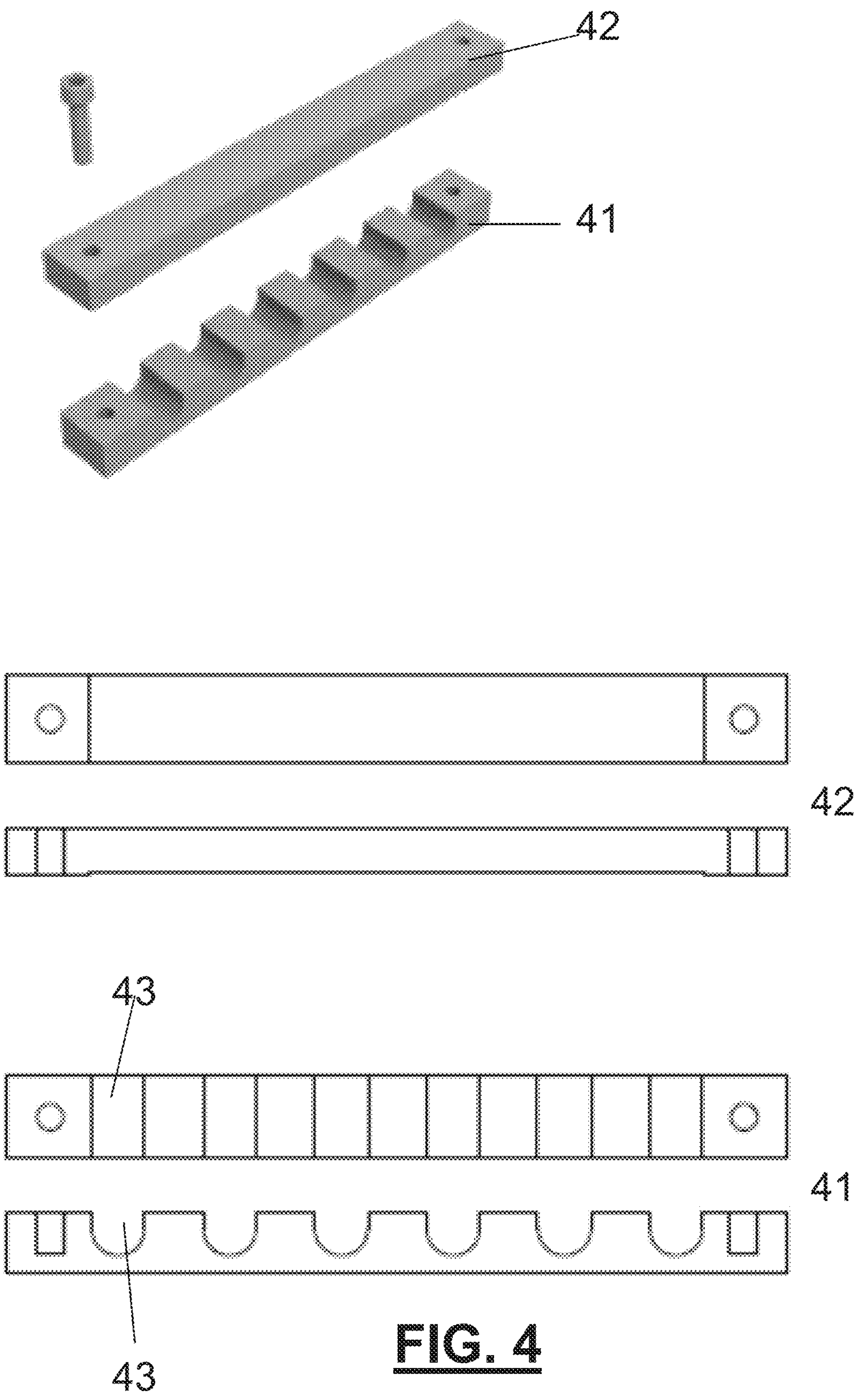
FIGS. 4, 5 and 6 show views of a retaining device for one or more plungers.
Figure 5:
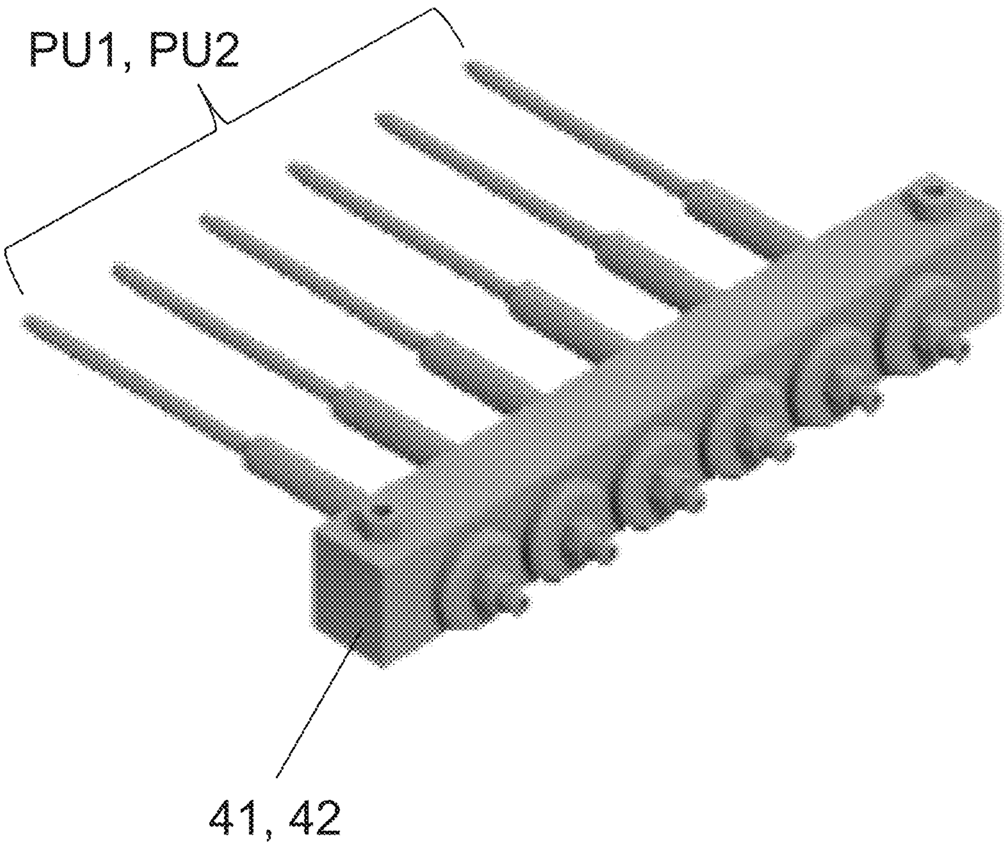
Figure 6:
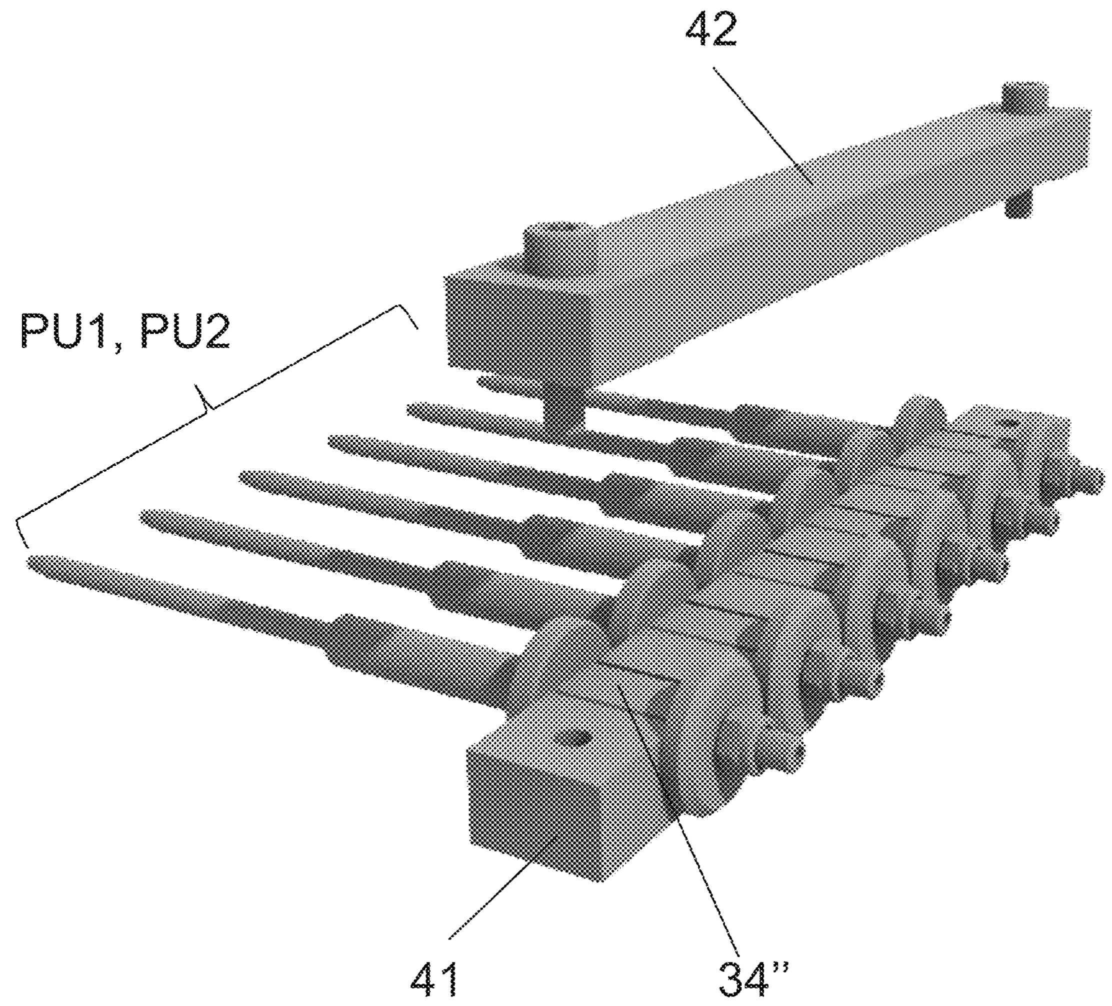

With reference to FIGS. 4, 5 and 6, the following will describe a retaining device for the sets of plungers. Two devices are employed, one for each set of plungers PU1, PU2.

The retaining device comprises two parts: a saddle 41 and a holder 42. The saddle has a series of cavities 43, one per plunger, adapted to firmly and removably contain a respective plunger stopper housing 34. The shape of the lateral surface of the cavity 43 matches the shape of the lateral surface 34' of the plunger stopper, so as to completely envelop it. In the example described herein, it has a truncated-circle curved shape, although other shapes are also possible, e.g. oval, square or polyhedric, for both the plunger surface 34' and the cavity 43.

Figure 7:
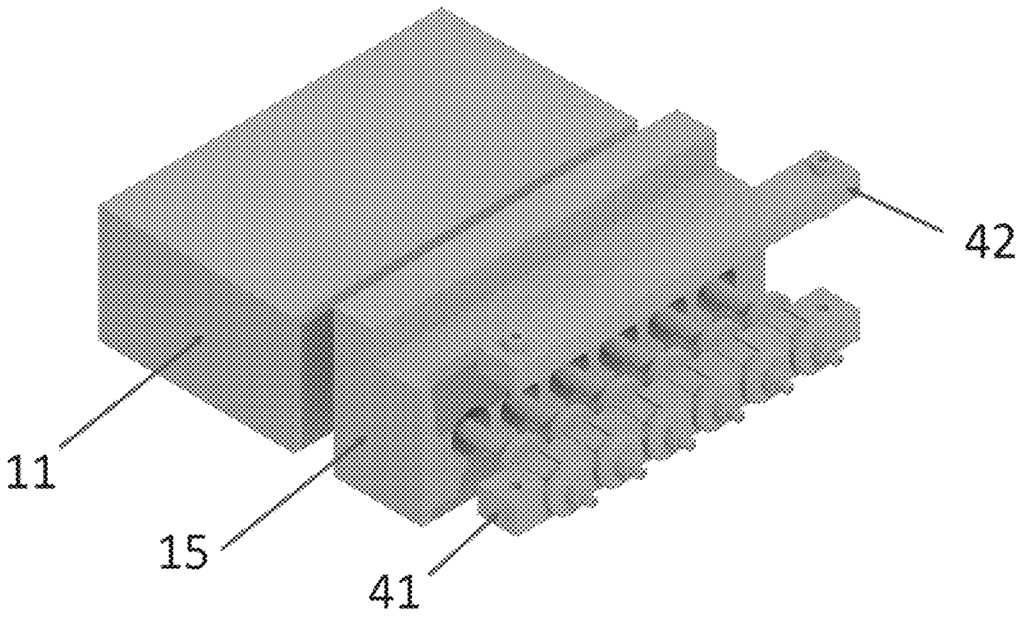
FIG. 7 shows an example of how the plungers and the retaining devices may be coupled to the body of the syringe-type pump.

FIGS. 6 and 7 clearly show that the flat part 34" of the plunger stopper housing 34 stays aligned with the top surface of the saddle 41. Once the plungers have been positioned in the saddle 41 (i.e. the stopper housings 34 have been placed in the cavities 43), the holder 42 is connected, e.g. by means of screws, to the saddle 41 in order to hold the plungers in position.

By acting upon the nuts 36 one can change the longitudinal position of each individual plunger relative to the retaining device, with the holder 42 connected to the saddle 41. The plunger stopper housing 34 will slide longitudinally relative to the holder 42 and the saddle 41. De facto, the abutment ring 33 will remain abutted against the saddle 41, while the ring 35 will move longitudinally.

The above-described example of embodiment may be subject to variations without departing from the protection scope of the present invention, including all equivalent designs known to a man skilled in the art.

The elements and features shown in the various preferred embodiments may be combined together without however departing from the protection scope of the present invention.

From the above description, those skilled in the art will be able to produce the object of the invention without introducing any further construction details.

The invention claimed is:

1. Plunger configured for application in a syringe-type pump for a machine for encapsulation of soft capsules, for adjusting the quantity of filler to be injected into said soft capsules, said plunger having an axially developing structure and comprising:
- a tip (31) and a sealing body (32) connected to the tip, adapted to penetrate into said syringe-type pump (P),
- a first mechanical abutment ring (33), fixedly positioned, connected to said sealing body,
- a plunger stopper housing (34), connected to said fixedly positioned mechanical abutment ring,
- a second mechanical abutment ring (35), axially adjustable,
- a mechanical dowel (37) protruding from said stopper housing,
- an adjuster nut (36) adapted to be screwed on said mechanical dowel (37) for adjusting the axial position of the second ring (35) relative to the first ring, so as to adjust the axial position of the plunger in said syringe-type pump (P).

2. Plunger as in claim 1, wherein said stopper housing (34) has a cross-section comprising a flat first part (34") and a curved second part (34').

3. Plunger as in claim 2, wherein said curved second part (34') has a lateral surface having a truncated-circle, oval, square or polyhedric shape.

4. Retaining device in said syringe-type pump, adapted to retain one or more plungers according to claim 2, the retaining device comprising a saddle (41) and a holder (42) that envelop said stopper housing (34) of said one or more plungers in a firm and removable manner, said adjuster nut (36) being adapted to axially adjust the position of the stopper housing (34) in said retaining device.

5. Retaining device as in claim 4, wherein said saddle (41) comprises one or more cavities (43) adapted to receive corresponding stopper housings (34) of said one or more plungers.

6. Retaining device as in claim 5, wherein said one or more cavities (43) have a surface shaped like said curved second part (34').

7. Retaining device as in claim 4, wherein said holder (42) has a flat surface where it matches said flat first part (34").

8. Syringe-type pump for a machine for encapsulation of soft capsules, comprising:
- one or more plungers, each plunger having an axially developing structure and comprising:
  - a tip (31) and a sealing body (32) connected to the tip, adapted to penetrate into said syringe-type pump (P),
  - a first mechanical abutment ring (33), fixedly positioned, connected to said sealing body,
  - a plunger stopper housing (34), connected to said fixedly positioned mechanical abutment ring (33),
  - a second mechanical abutment ring (35), axially adjustable,
  - a mechanical dowel (37) protruding from said stopper housing,
  - an adjuster nut (36) adapted to be screwed on said mechanical dowel (37) for adjusting the axial position of the second ring (35) relative to the first ring, so as to adjust the axial position of the plunger in said syringe-type pump (P); and
- one or more of retaining devices, each retaining device comprising a saddle (41) and a holder (42) that envelop said stopper housing (34) of said one or more plungers in a firm and removable manner, said adjuster nut (36) being adapted to axially adjust the position of the stopper housing (34) in said retaining device.

* * * * *